United States Patent [19]

Ozaki

[11] 4,338,829
[45] Jul. 13, 1982

[54] BICYCLE PEDAL
[75] Inventor: Nobuo Ozaki, Osaka, Japan
[73] Assignee: Maeda Industries, Ltd., Osaka, Japan
[21] Appl. No.: 96,320
[22] Filed: Nov. 21, 1979
[30] Foreign Application Priority Data Nov. 24, 1978 [JP] Japan ............................... 53-145513
Nov. 24, 1978 [JP] Japan ........................ 53-162158[U]

[51] Int. Cl.³ ........................................................ G05G 1/14
[52] U.S. Cl. ................................... 74/594.4; 74/560
[58] Field of Search ................. 74/560, 594.4, 594.5, 74/594.7, 594.1, 594.2, 470; 403/146, 166; 267/67, 136, 139

[56] References Cited
U.S. PATENT DOCUMENTS

| 235,551 | 12/1880 | Moran | 74/594.4 |
| 1,362,145 | 12/1920 | Saito | 74/594.4 |
| 2,024,499 | 12/1935 | Baron | 74/594.4 |
| 2,866,358 | 12/1958 | Duffy | 74/594.1 X |

FOREIGN PATENT DOCUMENTS

| 856270 | 11/1952 | Fed. Rep. of Germany | 74/594.4 |
| 339166 | 12/1904 | France | 74/594.4 |
| 624116 | 7/1927 | France | 74/594.4 |
| 567182 | 10/1957 | Italy | 74/594.4 |
| 18875 | of 1890 | United Kingdom | 74/594.4 |
| 443878 | 3/1936 | United Kingdom | 74/594.4 |

Primary Examiner—C. J. Husar
Assistant Examiner—Moshe I. Cohen
Attorney, Agent, or Firm—Birch, Stewart, Kolasch and Birch

[57] ABSTRACT

A bicycle pedal comprises a pedal spindle rotatably supporting a pedal body, at least one spring member being engaged with the pedal body so as to absorb shocks caused by axial impact forces imparted to the pedal.

6 Claims, 9 Drawing Figures

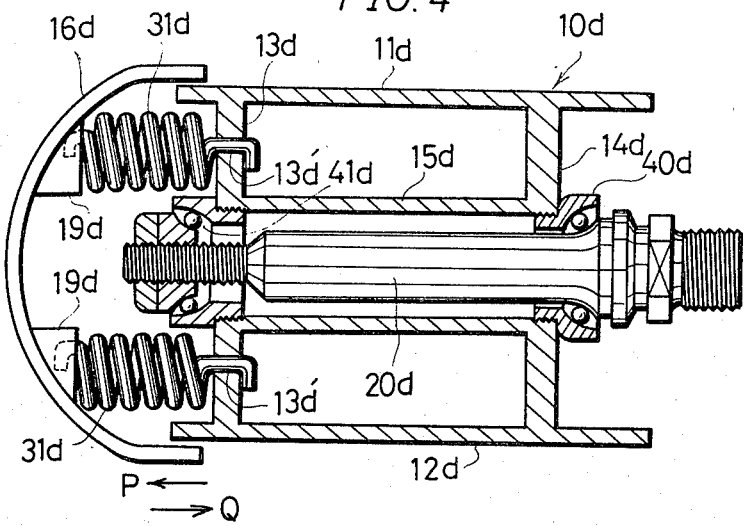
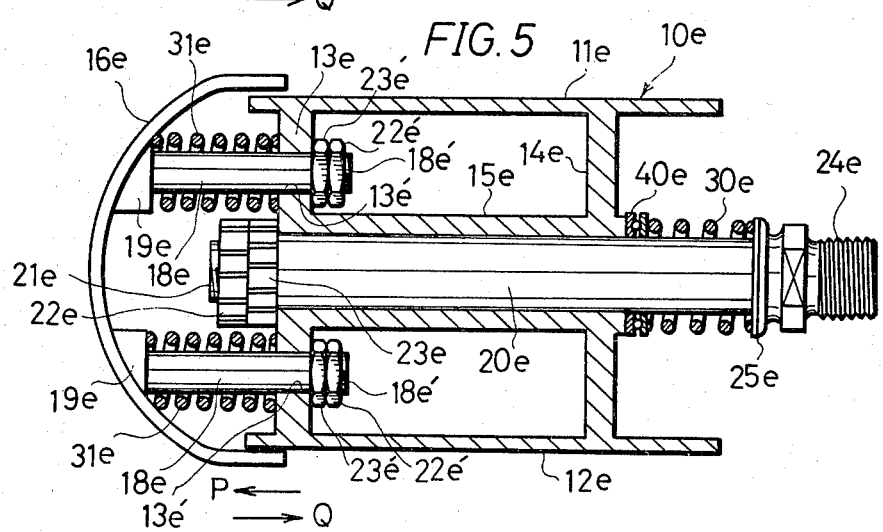
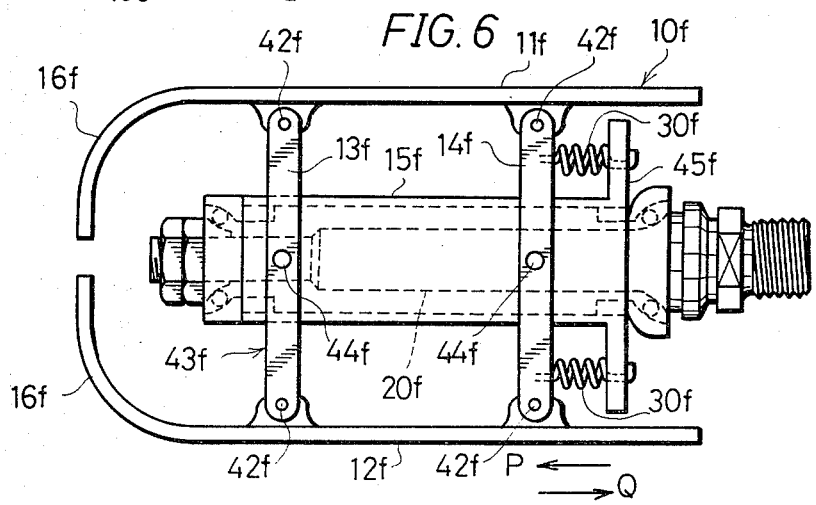

BICYCLE PEDAL

BACKGROUND AND SUMMARY OF THE INVENTION

This invention relates to a bicycle pedal, and more particularly to such a bicycle pedal as having a shock-absorbing means.

The conventional bicycle pedal has a rigid structure that is not capable of shock-absorbing. Therefore, an impact force imparted to the pedal is transmitted without reduction to bearing parts of the pedal spindle and/or a bicycle crank, occasionally causing damage to or deformation in the pedal or the crank. Specifically in motocross racing, wherein bicycles run in very rough fields and hills, the bicycles are likely to fall down quite frequently, causing deformation in the cranks or damage to bearing parts for the pedal spindle.

According to the present invention, the bicycle pedal has at least one spring member adapted to absorb shocks caused by an axial impact force applied to the pedal.

It is, therefore, a primary object of the present invention to provide a bicycle pedal which is capable of shock-absorbing against impact forces applied to the pedal substantially axially of the pedal spindle.

Another object of the invention is to prevent a bicycle pedal from damage to bearing parts for the pedal spindle by an impact force imparted to the pedal.

A further object of the invention is to prevent a bicycle crank from deformation caused by an impact force applied to the pedal.

Other objects, features and advantages of the invention will become apparent from the detailed description given hereinafter in connection with the accompanying drawings. It should be understood, however, that the detailed description and specific examples while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

In the accompanying drawings:

FIG. 4 is a similar view to FIG. 1, showing the fourth embodiment of the invention;

FIG. 5 is a similar view to FIG. 1, showing the fifth embodiment of the invention;

FIG. 6 is a similar view to FIG. 1, showing the sixth embodiment of the invention;

DESCRIPTION OF THE PREFERRED EMBODIMENTS

Figure 1:
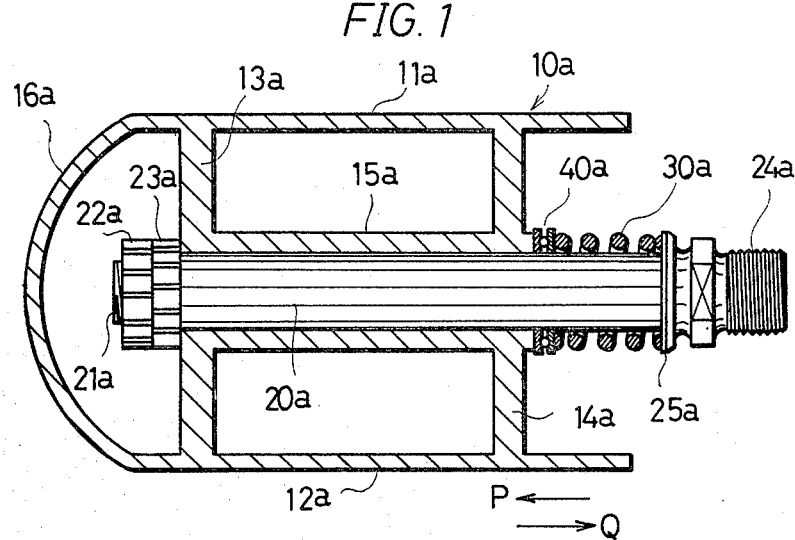
FIG. 1 is a sectional top plan view of the first embodiment according to the present invention.

Referring now to the drawings, FIG. 1 illustrates the first embodiment of the present invention, wherein the bicycle pedal includes a pedal body 10a which has a pair of side plates 11a, 12a, a front cross plate 13a, a rear cross plate 14a, and a tubular support 15a. The pedal body 10a is further provided with a front end plate 16a which is integral therewith.

A pedal spindle 20a is inserted through the tubular support 15a in such a manner that the pedal body is rotatable and axially slidable on the spindle. The spindle has a threaded front end 21a on which a pair of nuts 22a, 23a are mounted for preventing the spindle from being disengaged from the tubular support 15a. The spindle has a threaded rear end 24a by means of which the spindle is firmly screwed to a bicycle crank (not shown), conventionally.

A coil spring 30a is mounted on the spindle so as to be interposed between a bearing 40a mounted on the spindle and an annular flange 25a of the spindle, in such a manner that the spring 30a always urges the pedal body axially forwardly in the direction of an arrow P, so that the nut 23a is normally in contact with the front cross plate 13a. Thus, when a substantially axial impact force is applied to the front end plate 16a, the pedal body 10a is axially slidable on the spindle 20a in the direction of an arrow Q, resulting in that the applied shocks can be absorbed.

Figure 2:
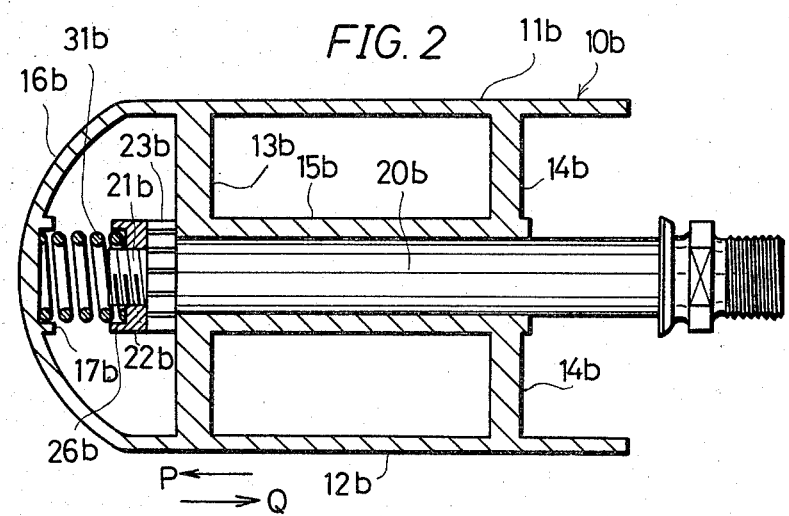
FIG. 2 is a similar view to FIG. 1, showing the second embodiment of the invention.

FIG. 2 shows the second embodiment of the invention, wherein the basic construction of a pedal body 10b and a pedal spindle 20b is substantially similar to that of the first embodiment described hereinabove. The difference is that a coil spring 31b is interposed between the internal wall of a front end plate 16b and a nut 22b mounted on the threaded front end 21b of the spindle 20b, in such a manner that the spring 31b always urges the pedal body 10b axially forwardly in the direction of the arrow P, so that the other nut 23b is normally in contact with a front cross plate 13b. Thus, when an axial impact force is imparted to the front end plate 16b, the pedal body is axially slidable on the spindle 20b in the direction of the arrow Q with the result that the applied shocks can be absorbed. In this embodiment, the front end plate 16b may preferably be provided with a spring retaining means 17b, and the nut 22b may also be provided with a cooperative spring retaining means 26b, so that the coil spring 31 can be held properly in position.

Figure 3:
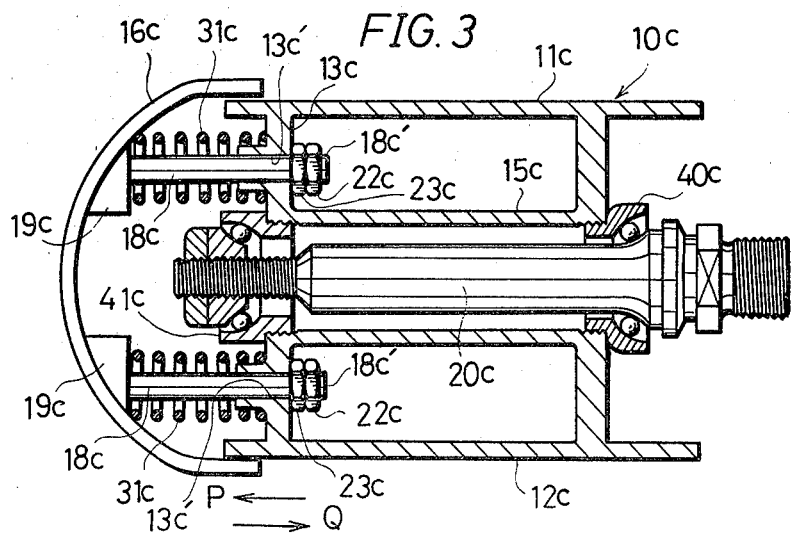
FIG. 3 is a similar view to FIG. 1, showing the third embodiment of the invention.

FIG. 3 shows the third embodiment of the invention, wherein a front end plate 16c is in the form of a separate piece from a pedal body 10c. A pair of coil springs 31c are interposed between the internal wall of the front end plate 16c and a front cross plate 13c. A pair of slide shafts 18c are disposed between the plates 13c and 16c so as to be axially guided by bores 13c' formed in the plate 13c and extend in parallel with the pedal spindle 20c. Each of the shafts 18c has a threaded rear end 18c' on which a pair of nuts 22c, 23c are mounted. Each of the coil springs 31c is disposed so as to surround the shaft 18c, in such a manner that the springs always urge the front end plate 16c axially forwardly in the direction of the arrow P, so that the nut 23c is normally in contact with the front cross plate 13c.

The pedal spindle 20c is disposed within a tubular support 15c and rotatably supported at its both ends by a pair of bearing means 40c, 41c, conventionally. Thus, when a substantially axial impact force is applied to the front cross plate 16c, the springs 31c are compressed and each of the shafts 18c is forced to axially slide against the resilient forces of the springs, so that the front cross plate 16c can be moved in the direction of the arrow Q, resulting in that the applied shocks can be absorbed. Additionally, reference numeral 19c denotes a pair of supporting bases which may preferably be formed with the internal wall of the end plate 16c for better supporting of the springs 31c.

FIG. 4 illustrates the fourth embodiment of the invention, wherein the basic construction and arrangement of a pedal body 10d, a front end plate 16d, a tubular support 15d, a pair of coil springs 31d and a pair of bearing means 40d, 41d are substantially similar to that of the afore-described third embodiment of the invention. The difference is that the pair of slide shafts 18c and the nuts 22c, 23c of the third embodiment are not provided here but each of the coil springs 31d is engaged at its ends with the front cross plate 13d and a supporting base 19d of the end plate 16d, respectively. Thus, when a substantially axial impact force is imparted to the end plate 16d, the springs 31d are compressed to absorb the applied shocks.

FIG. 5 shows the fifth embodiment of the invention, which is a combination of the first and the third embodiments described in the foregoing. The pedal body 10e has a pair of side plates 11e, 12e, a front cross plate 13e, a rear cross plate 14e, and a tubular support 15e. The pedal body further includes a front end plate 16e which is a separate piece from the pedal body 10e.

A pedal spindle 20e is inserted through the tubular support 15e in such a manner that the pedal body is rotatable and axially slidable on the spindle. The spindle has a threaded front end 21e on which a pair of nuts 22e, 23e are mounted for preventing the spindle from being disengaged from the tubular support 15e. The spindle has a threaded rear end 24e by means of which the spindle is firmly screwed to a bicycle crank (not shown), conventionally.

A pair of further coil springs 31e are interposed between the internal wall of the front end plate 16e and the front cross plate 13e. A pair of slide shafts 18e are disposed between the plates 13e and 16e so as to be axially guided by bores 13e' formed in the plate 13e and extend in parallel with the pedal spindle 20e. Each of the shafts 18e has a threaded rear end 18c' on which a pair of nuts 22e', 23e' are mounted. Each of the coil springs 31e is disposed so as to surround the shaft 18e, in such a manner that the springs 31e always urge the front end plate 16e axially forwardly in the direction of the arrow P, so that the nut 23e' is normally in contact with the front cross plate 16e.

Thus, when a substantially axial force is imparted to the end plate 16e, the coil springs 31e are compressed and the shafts 18e are axially moved together with the end plate 16e, while the pedal body 10e is axially slidable on the spindle 20e in the direction of the arrow Q, resulting in that the applied shocks can be absorbed more effectively as compared to the pedals of the afore-described first and the third embodiments of FIGS. 1 and 3.

FIG. 6 illustrates the sixth embodiment of the invention, wherein the pedal body 10f, has a pair of spaced side plates 11f, 12f each having an integral end plate 16f, and a pair of spaced cross plates 13f, 14f each being hinged at opposite ends thereof to said side plates by means of pins 42f so that the side plates 11f, 12f and the cross plates 13f, 14f cooperate to provide a parallelogramic frame 43f which is deformable when a substantially axial force is imparted to one of the end plates 16f. Each of the cross plates 13f, 14f is rotatably connected in its center to a tubular support 15f by means of a respective pin 44f. The support tube 15f, within which a pedal spindle 20f is rotatably supported, has a flange 45f at its rear end.

A pair of spaced coil springs 30f are interposed between said rear cross plate 14f and said flange 45f so as to press the cross plate 14f forwardly in the direction of the arrow P. Thus, when an impact force is imparted to one of the front end plates 16f, the parallelogramic frame 43f is deformed into a substantially diamond shape as the one coil spring 30f is compressed while the other coil spring 30f is stretched, with the result that the applied shocks can be absorbed.

Figure 7:
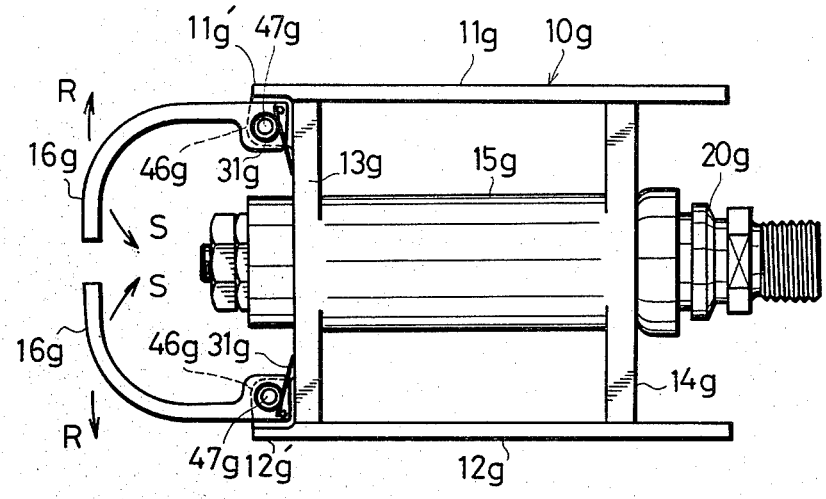
FIG. 7 is a similar view to FIG. 1, showing the seventh embodiment of the invention.

FIG. 7 shows the seventh embodiment of the invention, wherein the pedal body 10g has a pair of side plates 11g, 12g, a front cross plate 13g, a rear cross plate 14g and a tubular support 15g within which a pedal spindle 20g is rotatably supported. At the front portion of the pedal body 10g, a pair of supporting ears 46g are provided. Each of a pair of front end plates 16g is pivotally connected at its rear end to each ear 46g by means of a pin 47g. Each of a pair of torsion springs 31g is engaged with said pin 47g, in such a conventional manner that the pair of end plates 16g are always urged to open in the direction of an arrows R. The end plates 16g are restricted by forward end walls 11g', 12g' from being opened excessively. Thus, when an impact force is applied to any one or both of the end plates 16g, the end plate or plates 16g are moved to close in the direction of the arrow S against the resilient force of the torsion springs 31g, resulting in that the applied shocks can be absorbed.

In the first to seventh embodiments described in detail in connection with FIGS. 1 to 7, it should be understood that the construction and arrangement of the pedal according to the present invention may be varied in many ways and should not be limited to the specific examples as illustrated in the foregoing description and the accompanying drawings. In particular, the pedal body may be modified in various ways, as being apparent to those skilled in the art.

Further, in each of the first to seventh embodiments described, each of the pedal spindles 20a to 20g has a threaded rear end for screwing into a known threaded hole (not shown) formed in a conventional bicycle crank (not shown). However, the pedal spindle may be modified as shown in the following eighth and ninth embodiments of the invention.

Figure 8:
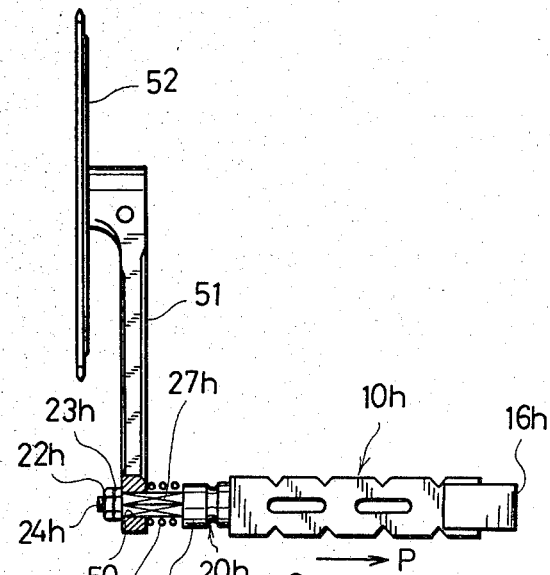
FIG. 8 is a side elevation showing the eighth embodiment of the invention.

FIG. 8 shows the eighth embodiment of the invention, wherein a pedal body 10h is rotatably supported by a pedal spindle 20h in such a conventional manner as described in the foregoing. The spindle 20h includes a threaded rear end 24h, a square slide portion 27h formed adjacent to said rear end 24h, and a flange 25h formed adjacent to said portion 27h. The square portion 27h is disposed within a square hole 50 formed in a bicycle crank 51, in such a manner that the spindle 20h is not rotatable but can be axially slidable. After the square slide portion 27h has been inserted through the square hole 50, a pair of nuts 22h, 23h are engaged with the threaded rear end 24h for connecting the spindle 20h to the crank 51.

A coil spring 30h surrounding the spindle is interposed between the crank 51 and the flange 25h so as to always urge the spindle 20h axially forwardly in the direction of the arrow P until the nut 23h gets in contact with the crank 51. Thus, when an impact force is applied to a front end plate 16h of the pedal body 10h, the pedal body is axially moved together with the spindle 20h in the direction of the arrow Q against the resilient force of the spring 30h, with the result that the applied shocks can be absorbed. Reference numeral 52 in FIG. 8 designates a known bicycle sprocket.

Figure 9:
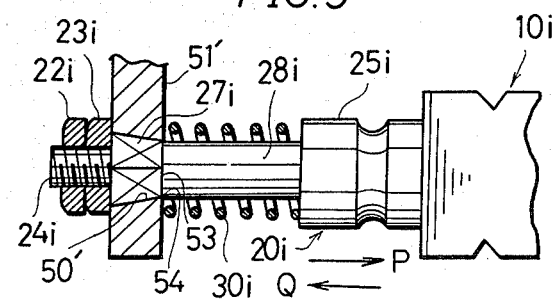
FIG. 9 is an enlarged, fragmentary elevation, partially in section, showing the ninth embodiment of the present invention.

FIG. 9 shows the ninth embodiment of the invention, wherein a pedal body 10i is rotatably supported by a pedal spindle 20i in the manner as described in the foregoing. The spindle 20i includes a threaded rear end 24i, a tapered square portion 27i formed adjacent to said rear end 24i, a round shaft portion 28i formed adjacent to the square portion 27i, and a flange 25i formed adjacent to the shaft portion 28i. The tapered square portion 27i is arranged so as to be engageable with a tapered square hole 50' formed in a bicycle crank 51'. The tapered square portion 27i is reduced in its external diameter at a position 53 adjacent to said shaft portion 28i, while the tapered square hole 50' is also reduced in its internal diameter at its front opening end 54. The external diameter of the shaft portion 28i may preferably be determined so as to be not larger than the reduced internal diameter at its front opening end 54 of the square hole 50', so that the shaft portion 28i can slide into the square hole 50'.

A coil spring 30i surrounds the round shaft portion 28i and is interposed between the crank 51' and the flange 25i so as to always urge the spindle 20i axially forwardly in the direction of the arrow P until a nut 23i contacts the crack 51'. Thus, in operation, the tapered square portion 27i is firmly engaged with the tapered square hole 50' since the spindle is urged axially forwardly by the function of the spring 30i, so that the spindle 20i is fixedly supported by the crank 51. When an axial impact force is applied to a front end of the pedal body 10i, the spindle is axially slidable in the direction of the arrow Q against the resiliency of the spring 30i, resulting in that the applied shocks can be absorbed.

The present invention being thus described, it will be obvious that same may be varied in many ways. For example, various types of the springs may be utilized in the invention in place of the coil springs and torsion springs herein described. Such variations are not to be regarded as a departure from the spirit and scope of the present invention, and all such modifications as would be obvious to one skilled in the art are intended to be included within the scope of the following claims.

I claim:

1. A bicycle pedal comprising
   a pedal spindle connected to a bicycle crank,
   a pedal body rotatably supported by said pedal spindle,
   said pedal body having a cross plate,
   a front end plate in the form of a separate piece from said pedal body being disposed adjacent said pedal body, and
   at least one spring member interposed between said cross plate and said front end plate so as to urge said front end plate axially forwardly.

2. The pedal as defined in claim 1, which includes
   at least one slide shaft slidably supported by said cross plate,
   one end of said slide shaft being connected to said front end plate, and
   said spring member being in the form of a coil spring which surrounds said slide shaft and is interposed between said cross plate and said front end plate so as to urge the front end plate axially forwardly.

3. A bicycle pedal comprising
   a pedal spindle connected to a bicycle crank,
   a pedal body rotatably supported by said pedal spindle,
   said pedal body including a pair of spaced side plates each having an integral front end plate, a front cross plate and a rear cross plate, each being hinged to said pair of side plates so as to form a deformable parallelogramic frame,
   said front and rear cross plates being rotatably supported by pins mounted to a tubular support within which said pedal spindle is disposed,
   said tubular support having a flange formed at its rear end, and
   at least a pair of spaced spring members interposed between said rear cross plate and said flange.

4. A bicycle pedal comprising
   a pedal spindle connected to a bicycle crank,
   a pedal body rotatably supported by said pedal spindle,
   a pair of front end plates pivotally connected at one end to said pedal body, and
   a pair of torsion springs, each of which is engaged at its one end with said pedal body and at its other end with one of said pair of front end plates so as to always urge the front end plates in one direction.

5. A bicycle pedal comprising
   a pedal spindle having a threaded end and a square portion formed adjacent to said threaded end,
   said square portion being engageable with a square hole formed in a bicycle crank, and
   a spring member interposed between said crank and a flange formed with said pedal spindle so as to always urge said pedal body together with said pedal spindle axially forwardly.

6. The pedal as defined in claim 5, wherein
   said square portion is in the form of a tapered square portion whose external diameter is reduced at its front end, and
   said square hole is in the form of a tapered square hole whose internal diameter is reduced at its front opening end.

* * * * *